United States Patent

[11] 3,610,561

| [72] | Inventor | Beverly Greenwood<br>420 N.W. 29th St., Oklahoma City, Okla.<br>73103 |
|---|---|---|
| [21] | Appl. No. | 876,354 |
| [22] | Filed | Nov. 13, 1969 |
| [45] | Patented | Oct. 5, 1971 |

[54] CLIPS FOR MOUNTING ELECTRICAL FITTINGS IN NEW WALL AND CEILING CONSTRUCTION
3 Claims, 4 Drawing Figs.

[52] U.S. Cl. .................................................. 248/205,
220/3.5, 248/27
[51] Int. Cl. ......................................................... H02g 3/08
[50] Field of Search ............................................ 248/205,
27; 85/36; 220/3.2, 3.5, 3.6, 3.4, 3.9, 3.3, 18

[56] References Cited
UNITED STATES PATENTS
| 2,706,315 | 4/1955 | Price ............................ | 85/36 X |
| 3,315,924 | 4/1967 | Greenwood ................. | 248/342 X |

Primary Examiner—J. Franklin Foss
Attorney—Dunlap, Laney, Hessin & Dougherty

ABSTRACT: Clips for mounting electrical outlet boxes to wall and ceiling constructions, such clips including a monoplanar screw-engaging face, a box-engaging projection extending generally perpendicular to the screw-engaging face, and at least one brace flange extending from the screw-engaging face and spaced from the box-engaging projection to permit one wall of an electrical box to be positioned between the box-engaging projection and the brace flange. The screw-engaging face is perforated over at least a portion of its areal extent, with the perforations formed through the screw-engaging face being bounded on one side of such face by a plurality of times which project out of the screw-engaging face.

PATENTED OCT 5 1971 3,610,561

INVENTOR
BEVERLY GREENWOOD
BY
Dunlap, Janey, Hessin & Dougherty
ATTORNEYS

3,610,561

CLIPS FOR MOUNTING ELECTRICAL FITTINGS IN NEW WALL AND CEILING CONSTRUCTION

BACKGROUND OF THE INVENTION

1. Field of the Invention

This invention relates to brackets, clips, fasteners and fixtures of the type used for securing electrical boxes or outlets in walls or ceilings. More particularly, the invention relates to clips and brackets used for securing hollow, parallelepiped-shaped electrical boxes to walls and ceilings of dry or plaster construction during the initial construction of such walls and ceilings.

2. Brief Description of the Prior Art

In my U.S. Pat. No. 3,315,924 issued Apr. 25, 1967, I have described certain types of improved brackets and clips for mounting or securing in walls and ceilings, electrical conduit boxes for outlets to permit electrical service to be made available in certain locations throughout a building containing such walls and ceilings. These brackets provide advantages over prior types of strips, wiring arrangements and the like used for this purpose in being relatively easily and quickly installed, in being mechanically sturdy, and in providing anchorage and securement of the electrical conduit boxes at substantially any desired location in walls or ceilings constructed of wallboard, plaster or the like. The brackets can be employed, whether or not the electrical boxes to be mounted have a retaining plaster ring or similarly functioning element associated therewith. The brackets eliminate the necessity for extending rigid supporting members, such as lathes, stringers or the like, horizontally or vertically along the back side of the plaster, sheetrock or other construction in order to provide sufficient anchorage and support for the electrical conduit boxes.

In the usage of the brackets described in my patent, sheet metal screws are extended through the material of which the wall or ceiling is constructed so as to contact dimples or indentations formed in a screw-engaging face which abuts flatly against the back side of the panels of which the walls and ceilings are constructed. The dimples serve an important function in guiding the screws and preventing them from becoming canted or angled so as to improperly engage the screw-engaging face of the bracket, or to fail to penetrate such screw-engaging face.

Although the brackets or clips constructed as described in my U.S. Pat. No. 3,315,924 have been widely accepted and successfully employed for the purpose of mounting the electrical conduit boxes in the manner described, it has been determined that not infrequently, considerable difficulty is encountered in extending the screws through the screw-engaging face of the clip in an expeditious and satisfactory manner. Rather, it has become a preferred practice of installers and construction personnel to secure the brackets to the wall or ceiling by first slightly penetrating the screw-engaging face at the location of one of the dimples by use of an electrical drill, and then passing the screw through the thus formed opening to engage and hold the screw-engaging face and the bracket of which it is a part securely in position.

I have further experienced an undesirable effect of the described mode of installation in which an electrical drill is used to preform a slight opening or aperture at the location of a dimple in the screw-engaging face. This undesirable effect is that when this procedure is employed, the screws which are utilized do not always securely engage the screw-engaging face over as long a period of time as would be optimum. In other words, some instances have occurred where after relatively short periods of time, the screw or screws used to engage the brackets have been slipped out of, or pulled free from, the screw-engaging face, thus failing to continue to afford support and securement to the brackets and to the electrical conduit boxes with which they are associated.

BRIEF DESCRIPTION OF THE PRESENT INVENTION

The present invention constitutes an improvement on the bracket or clip devices described in my U.S. Pat. No. 3,315,924, and improves such clips or brackets in respect to the deficiency thereof which I have described. Thus, the clips or brackets of the present invention permit quick and failure-free securement of the clips, first to the electrical conduit boxes, and then to the wallboard, plaster, sheetrock or the like, utilizing only a screwdriver to engage the screws with the screw-engaging face of the clips.

Broadly described, the clips or brackets of the present invention for mounting electrical fittings in walls or in ceilings comprise a screw-engaging face which has formed therein, a plurality of perforations which are surrounded on one side of the screw-engaging face by a plurality of tangs or tines which are preferably formed by perforating the screw-engaging face using a chisel of pyramidal or conical headed construction. Extending normal or generally perpendicularly to the screw-engaging face is a box-engaging projection which functions to engage the electrical conduit box or fitting which is to be installed on the wall or ceiling. There is further provided at least one brace flange which extends from the screw-engaging face, and which functions to prevent collapse or bending of the screw-engaging face toward the wall of an electrical conduit box to which the clip or bracket is secured. The brace flange preferably extends from the screw-engaging face so as to occupy a plane which extends substantially perpendicular to the box engaging projection, and the brace flange is spaced from the box-engaging projection so as to permit one wall of the electrical box to be positioned between the box-engaging projection and the brace flange.

In a preferred embodiment of the invention, the box-engaging projection and the brace flange each extend at a right angle from the screw-engaging face and are spaced from each other by a distance which corresponds, or is substantially equivalent to, the thickness of the wall of the electrical conduit box which is to be positioned therebetween as the clip or bracket is used for securing such box to the wall or ceiling. It is further preferred to form the box-engaging projection in a generally U-shaped configuration, and to provide a plurality of tangs or tabs along the length thereof which can be bent to a position in which the tangs function to tightly secure the clip or bracket to one side of an electrical box.

From the foregoing description of the invention, it will be apparent that a major object of the present invention is to provide an improved bracket or clip which can be used for quickly mounting electrical conduit boxes in new wall and ceiling construction using simple hand tools.

Another important object of the invention is to provide an improved clip or bracket for securing electrical fittings and boxes to sheetrock, wallboard, plaster and the like in a way which will provide a long lasting and reliable anchorage for such boxes.

An additional object of the present invention is to provide an improved clip or bracket for securing electrical conduit boxes to a wall or ceiling by the use of screws extended through a portion of the brackets in such a way that the screws will not separate, or become disengaged, from the brackets over extended periods of time.

A further object of the invention is to retain the simplicity and mechanical strength of a presently known, widely used clip or bracket for mounting electrical boxes in walls and ceilings, while improving the ease with which such clips and brackets may be utilized, and reducing the complexity and expense of tools presently employed in their installation.

Other objects and advantages of the invention will become apparent as the following detailed description of the invention is read in conjunction with the accompanying drawings which illustrate the invention.

DETAILED DESCRIPTION OF PREFERRED EMBODIMENTS OF THE INVENTION

Figure 1:
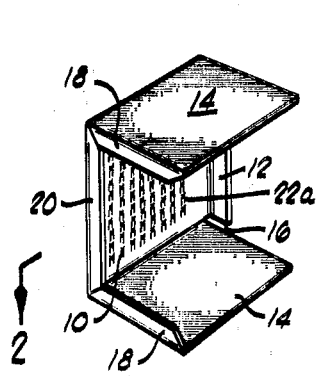
FIG. 1 is a perspective view of one embodiment of a clip or bracket constructed in accordance with the invention.

The embodiment of the invention illustrated in FIG. 1 includes a screw engaging face 10 which has projecting perpendicularly from one side edge thereof, a box engaging projection 12. The screw-engaging face 10 also has projecting normal thereto a pair of substantially parallel brace flanges 14. It will also be noted that the brace flanges 14 each extend substantially normal to the plane of the box engaging projection. The box-engaging projection 12 is spaced from the brace flanges 14 so that a gap 16 is provided for the accommodation of the sidewall of an electrical conduit box as hereinafter described. For further strengthening of the clip, a pair of ribs 18 are provided on the opposite ends of the brace flanges 14 from their ends adjacent the box-engaging projection 12. A rib 20 is also provided at the edge of the screw-engaging face 10 which is opposite its end carrying the box-engaging projection 12.

Figure 2:
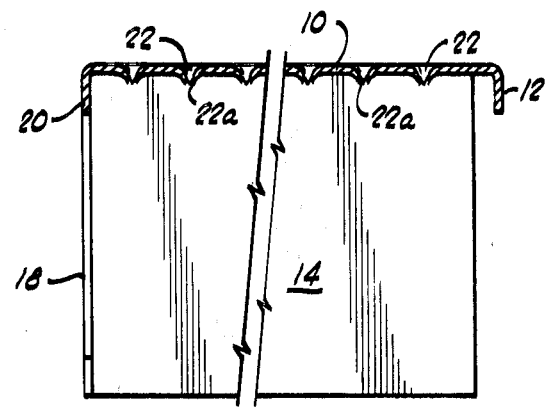
FIG. 2 is an enlarged sectional view taken along line 2—2 of the clip shown in FIG. 1.

An important feature of the present invention is the manner in which a plurality of perforations are formed over a major portion of the total surface area of the screw-engaging face 10. This construction is best illustrated in FIG. 2 of the drawings. Here it will be noted that each one of the perforations, designated generally by reference numeral 22, is defined or bounded on one side of the screw-engaging face 10 by a plurality of tangs or tines 22a. Usually there will be either three or four of these tines 22a that will be grouped symmetrically around the respective perforation which they bound. Each of the tines 22a is triangular in configuration and the tines around each perforation are inclined toward each other. It will further be noted in referring to FIG. 2 that the opening to each perforation 22 on the opposite side of the screw-engaging face from the side which carries the tines 22a is generally conically shaped or tapered inwardly so that the opening tends to be of diminishing diameter as it progresses further through the perforations. It will also be noted in referring to FIG. 2 that the tines 22a are formed on that side of the screw-engaging face 10 which is the side from which the box-engaging projection 12 extends. A preferred method of forming the perforations 22 so as to attain the described tine configuration is to punch the perforations 22 through the screw-engaging face 10 by the use of a chisel or other pointed implement having a head of conical or pyramidal configuration. Moreover, this prestresses and work hardens the tines so that they will firmly engage the threads of a screw without collapsing or bending.

Figure 3:
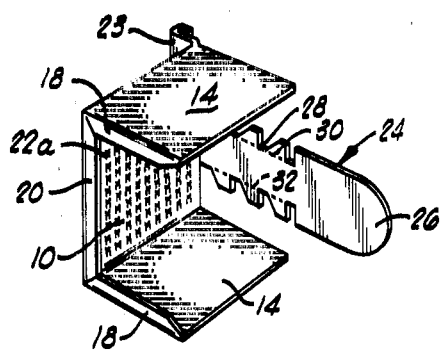
FIG. 3 is a perspective view of another embodiment of the invention.

Another embodiment of the invention is depicted in FIG. 3 of the drawings. Since this form of the invention has some structural elements in common with the embodiment of the invention depicted in FIGS. 1 and 2, identical reference numerals have been utilized for the identification of identical elements. Thus, the clip depicted in FIG. 3 includes a screw-engaging face 10 having perforations 22 formed therein, and having a pair of parallel brace flanges 14 extending perpendicularly from the opposite side edges therefrom. The clip further includes a pair of ribs 18 formed at the end edges of the brace flanges 14, and a rib 20 formed at one end edge of the screw-engaging face 10.

At the opposite end of the screw-engaging face 10 from the rib 20, a box-engaging flange 23 is bent perpendicularly to the screw-engaging face 10, but extends from this face in the opposite direction from the direction of extension therefrom of the brace flanges 14. The box-engaging flange 23 is then bent through 180° or, stated differently, through a reverse bend which has an elongated box-engaging projection designated generally by reference numeral 24, formed thereon, and extending substantially parallel to the ribs 18.

The box-engaging projection 24 has a tongue 26 formed at its free end opposite that end which is connected to the box-engaging flange 23. Between the tongue 26 and the box-engaging flange 23, the box-engaging projection 24 has a plurality of serrations or notches 28 formed in the opposite side edges thereof so that these notches define a plurality of tabs 30. The tabs 30 are dimensioned to facilitate bending them from the position illustrated in FIG. 3 to a position in which they extend at substantially a right angle with respect to the plane of the box-engaging projection 24. The tabs when thus bent are bent along lines indicated in dashed lines 32 in FIG. 3.

In utilizing the clips of the invention for securing an electrical conduit box to a wall or ceiling the panels of which the wall or ceiling are constructed must first be cut to provide an opening through which the electrical box will face. When the clips of the present invention are utilized, these openings can be formed at substantially any desired location, since no supporting members such as stringers, lathes or the like are required to support the box. When the opening has been formed to accommodate the electrical box, it is placed in position so that it is exposed through the opening by extending the conduits or pipes which carry the electrical cables or connections into proximity to the opening so that the box is fitted in the proper location.

Figure 4:
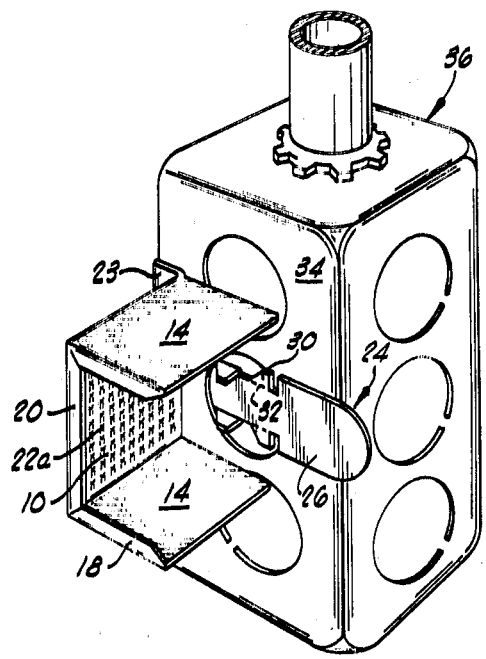
FIG. 4 is a perspective view of the clip shown in FIG. 3 as it is utilized for securing an electrical conduit box to a wall or ceiling.

The clips or brackets of the invention are then secured to the electrical boxes by attachment to each of the opposed sidewalls thereof adjacent the front edge of the box which faces the opening cut in the wall or ceiling. This orientation of box and clips is described in greater detail in my U.S. Pat. No. 3,315,924. In the securement of the clips or brackets to the electrical box, the embodiments depicted in FIGS. 1 and 3 of the drawings are used similarly. As depicted in FIG. 4, the embodiment of the clip shown in FIG. 3 has been secured in place to one side 34 of a parallelepiped-shaped electrical conduit box designated generally by reference numeral 36. This electrical box 36 is a type which does not use or include a plaster ring on the front side thereof.

In installing the clip on the sidewall 34 of the box 36, one of the several knockout plugs 38 conventionally formed in the side of the box is removed to provide a circular opening in the side of the box. The tab 26 of the box-engaging projection 24 is then extended from the open front side of the box 36 inwardly and passed out through the opening which has been formed by removal of the knockout plug. The tab 26 thus projects on the outside of the box as illustrated in FIG. 4. The clip is then pressed rearwardly along the sidewall 34 of the box 36 until the front edge of the sidewall abuts against the bight or reverse bend formed by the juncture of the box-engaging flange 23 with the box-engaging projection 24. When the clip is thus seated, selected tabs 30 are bent over to a position in which they extend substantially normal to the plane of the box-engaging projection 24, and so that they contact and engage the circular periphery of the hole formed in the sidewall of the box.

The clip is now secured in position, and when a second clip is secured on the opposite sidewall of the box 36 in the same manner, the assembly thus formed is ready to be fastened to the back side of the paneling of which the wall or ceiling in which it is to be located is made. The installer then draws the electrical box 36 inwardly toward the opening formed in the wall or ceiling until the screw-engaging faces 10 of the two clips engaged with the box abut flatly against the back side of the wall or ceiling panel.

While the clips are in this position, the workman installing the assembly then passes suitable screws through the panel of the wall or ceiling from the forward side thereof until the point of the screws pass into one of the perforations 22. Continued turning of the screws will drive them through the perforations into which they project until the tines 22a become interlocked with the threads of the screw. From this point, further rotation of the screws will cause the screws to be driven through the panels of the wall or ceiling until the heads are flush with, or countersunk in, such panels. The tines 22a constantly engage the threads of the screws and resist any tendency of the screw-engaging face 10 to slip out or break free, which tendency would otherwise exist except for the presence of the tines 22a. No tool is required for this installation and the setting of the screws other than a simple screwdriver.

When the embodiment of the invention depicted in FIG. 1 is utilized, the clips are retained in position by securing a plaster ring against the front face of the electrical box, and thus assuring that the clips cannot slip forwardly relative to the box and the box therefore cannot become detached from the box-engaging projections 2 which are extended along the inside of the side walls thereof.

Although certain preferred embodiments of the invention have been herein described, it will be understood that various modifications and changes can be made in the illustrated structure without departure from the basic principles which underlie the invention. Changes and innovations of this type are therefore deemed to be circumscribed by the spirit and scope of the invention except as the same may be necessarily limited by the appended claims or reasonable equivalents thereof.

What is claimed is:

1. A clip for securing electrical conduit boxes to walls or ceilings comprising:
    a screw-engaging face having a plurality of perforations therein, and further having a plurality of tines grouped around each of said perforations and projecting from one side of said screw-engaging face;
    a box-engaging projection extending from said screw-engaging face in a plane substantially normal thereto and in the same direction therefrom as said tines extend;
    a box-engaging flange interconnecting said box-engaging projection and said screw-engaging face and projecting from the opposite side of said screw-engaging face from the side from which said tines project, said box-engaging projection being further characterized in having a plurality of bendable taps thereon for securing said box-engaging projection in a knockout hole in an electrical conduit box.

2. In combination with an electrical conduit box of generally right parallelepiped configuration having an open front, a back, and a pair of substantially parallel sidewalls extending normal to said back and having forward edges adjacent said open front,
    a pair of clips each engaging a separate one of the sidewalls of said electrical conduit box, each of said clips comprising:
    a box-engaging projection hooked over the forward edge of the respective adjacent sidewall of the electrical conduit box to which the respective clip is engaged;
    a perforated screw-engaging face extending substantially normal to said box-engaging projection in a plane extending substantially parallel to the open front of said electrical conduit box and substantially normal to the sidewalls thereof; said screw-engaging face having perforations extending therethrough covering a major portion of the total areal extend of said screw-engaging face, and wherein each of said perforations has a substantially conically shaped opening thereinto on one side of said screw-engaging face, and is further characterized in having a plurality of tines grouped around said opening through the screw-engaging face disposed on the opposite side of said screw-engaging face from the conically shaped opening therethrough, said tines in the grouping around each perforation opening being inclined toward each other within the grouping, and each of said tines being substantially triangular in configuration and terminating in a point spaced from the major plane of said screw-engaging face, said tines being at least three in number within each grouping around each perforation opening, and the tines each being prestressed to a work hardened state; and
    a pair of brace flanges bearing against the respective adjacent sidewall of said electrical conduit box, and each formed integrally with, and extending normal to, said screw-engaging face in the same direction as said box-engaging projection and said tines extend therefrom, said brace flanges extending substantially parallel to each other and being spaced from said box-engaging projection to receive between the brace flanges and the box-engaging projection, the respective adjacent sidewall of said electrical conduit box to which the respective clip is engaged.

3. A clip as defined in claim 1 wherein there are at least three of said tines around each of said perforations, and the tines around each of said perforations are inclined toward each other and are prestressed to a work-hardened state.